United States Patent [19]

Pavlou

[11] 3,934,238
[45] Jan. 20, 1976

[54] DIFFERENTIAL PRESSURE VISUAL AND AUDIBLE WARNING SIGNAL DEVICE FOR HYDRAULIC AND PNEUMATIC SYSTEMS

[75] Inventor: George S. Pavlou, Madison, Wis.
[73] Assignee: Ambac Industries, Inc., Carle Place, N.Y.
[22] Filed: Mar. 4, 1975
[21] Appl. No.: 555,158

[52] U.S. Cl. ............ 340/239 F; 116/70; 200/82 R; 210/90; 340/60; 55/274
[51] Int. Cl.² .................. G08B 21/00; B01D 35/14
[58] Field of Search ................ 340/239 F, 242, 60; 55/274, DIG. 34; 200/82 R; 210/90, 118; 116/70

[56] References Cited
UNITED STATES PATENTS

| | | | |
|---|---|---|---|
| 1,411,802 | 4/1922 | Mosher | 340/239 F |
| 2,843,077 | 7/1958 | Leefer | 340/239 F UX |
| 3,154,049 | 10/1964 | Smith et al. | 210/90 X |
| 3,429,291 | 2/1969 | Hoffman | 116/70 |
| 3,646,906 | 3/1972 | Hammer | 116/70 |
| 3,790,931 | 2/1974 | Leveraus | 340/60 |
| 3,896,280 | 7/1975 | Blake | 340/239 F X |

FOREIGN PATENTS OR APPLICATIONS

| | | | |
|---|---|---|---|
| 1,012,571 | 12/1965 | United Kingdom | 340/239 F |

Primary Examiner—John W. Caldwell
Assistant Examiner—Daniel Myer
Attorney, Agent, or Firm—Charles B. Cannon

[57] ABSTRACT

A combination visual and audible differential pressure warning signal device for fluid power, that is, hydraulic and pneumatic systems such, for example, as those employed in mobile equipment, industrial machinery, or the like. Thus, in a typical use of the invention, when the pressure in the hydraulic system, as in an oil filter, drops below a desired and predetermined normal, due to clogging of the filter, or for other reasons, the hydraulic pressure from the source, such as an oil pump, overcomes the combined pressure or force of the oil entering the signal device from the filter and the force of a resetting coil spring in the signal device, to actuate magnetic means which raises a normally concealed colored (red) visual warning signal into a position in which it may be seen through a window in the body of the signal device while, at the same time, closing an electrical circuit to an audio or audio-visual warning signal device. Both the visual signal and the audio or audio-visual signals remain in actuated position until the difficulty in the oil filter, or the like, is corrected, and the hydraulic pressure in the system, as from an oil filter, is restored to normal, whereupon the force of the resetting coil spring, in conjunction with the force of gravity, returns the parts to their normal position, thereby moving the colored visual signal to its normal concealed position while, at the same time, breaking the electrical circuit to the audio or audio-visual signal device.

13 Claims, 12 Drawing Figures

DIFFERENTIAL PRESSURE VISUAL AND AUDIBLE WARNING SIGNAL DEVICE FOR HYDRAULIC AND PNEUMATIC SYSTEMS

OBJECTS OF THE INVENTION

A primary object of the invention is to provide a new and improved and relatively simple combination differential pressure visual and audio or audio-visual warning signal device for hydraulic and pneumatic systems.

Another object of the invention is to provide a new and improved and relatively simple combination visual and audio or audio-visual differential pressure warning signal device for use in hydraulic and pneumatic systems, such, for example, as those employed in mobile equipment, industrial machinery, or the like.

A further object of the invention is to provide a new and improved differential pressure visual and audio or audio-visual warning signal device which may be mounted on a suitable support adjacent the system in which it is used or in a housing which forms a part of the system in which the new warning signal device is used.

Other objects will appear hereinafter.

GENERAL DESCRIPTION OF THE COMBINATION AND OPERATION OF THE PREFERRED FORM OF THE INVENTION ILLUSTRATED IN FIGS. 1 TO 8, INCLUSIVE

Figure 8:
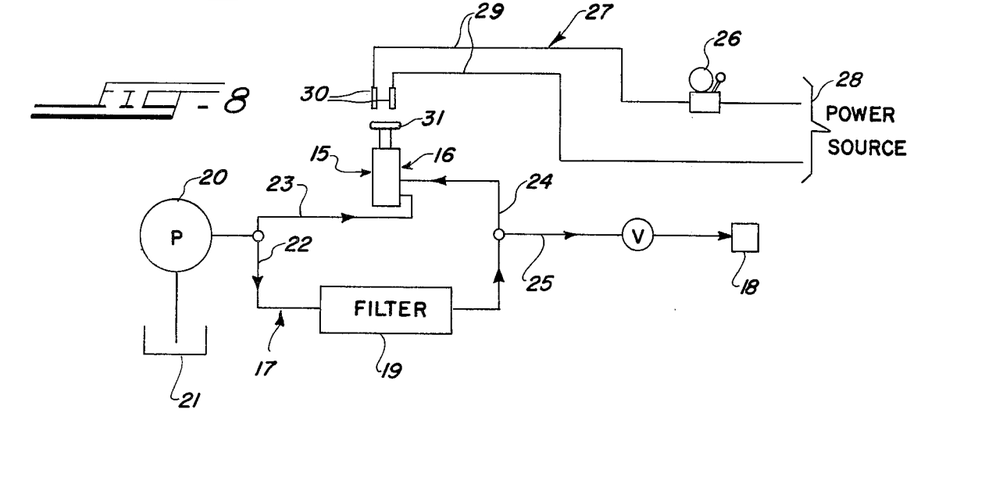
FIG. 8 is a schematic diagram of a typical hydraulic system in which the new combination visual and audio or audio-visual differential pressure warning signal device illustrated in FIGS. 1 to 7, inclusive, may be used and illustrating the electrical circuit embodied in the invention for actuating the audio or audio-visual warning signal device.
Figure 9:
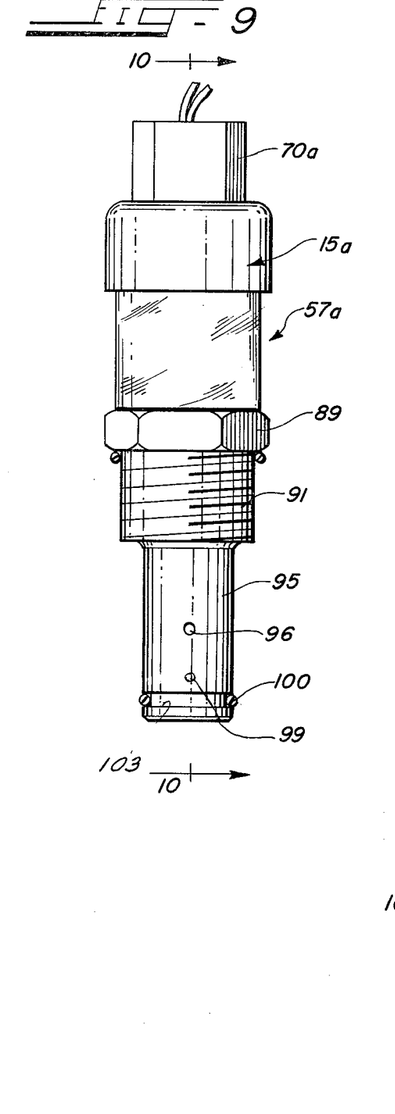
FIG. 9 is an elevational view of a modified form of the invention.

A typical and preferred embodiment of the invention is illustrated in FIGS. 1 to 8, inclusive, of the drawings, wherein it is generally indicated at 15, and includes a housing 16, which will be described in detail hereinafter. The new combination visual and audio or audio-visual differential pressure warning signal device 15 is shown in FIG. 8 as employed in a typical use thereof, namely, as being arranged in an hydraulic system which is shown as being in the form of an oil filter system 17 for a hydraulic system of a lift truck 18 and which system 17 includes an oil filter 19 and an hydraulic pump 20 which supplies oil under a predetermined pressure to the system 17 from a source 21.

As shown in FIG. 8, one side of the hydraulic (oil) system 17 leads from the pump 20 by way of a line 23 to a high pressure inlet 42–43 in the housing 16 of the new visual and audio or audio-visual differential pressure warning signal device; and another line 24 leads from the filter 19 to a low pressure inlet 45–46 in the housing 16.

The new combination visual and audible differential pressure warning signal device 15 includes a visual signal, which will be described hereinafter, and an audio or audio-visual signal device in the form of an electrically operable audible or audio-visual alarm 26, of any conventional design and construction, and which is arranged in an electrical alarm circuit generally indicated at 27 and which is electrically connected to a suitable electrical power source 28 (FIG. 8).

The electrical alarm circuit 27 includes a pair of electrical conductors 29 and a pair of spaced stationary electrical contact members 30 which are electrically connected thereto within the housing 16 (FIG. 2), as will be more particularly described hereinafter. The new combination visual and audio or audio-visual warning signal device 15 also includes a movable elecrtical contact member 31, which is movably mounted in the housing 16, and spring means in the form of a resetting compression coil spring 32 which is capable of exerting a predetermined pressure or a force on a torroidal magnet 75 on which a movable contact member 31 is mounted.

The construction and arrangement of the new visual and audio or audio-visual signal device 15 and its arrangement in the hydraulic (oil filter) system 17, and in conjunction with the electrical alarm circuit 27, are such that the hydraulic pressure of the oil entering the housing 16, by way of the low pressure inlet 45–46, coupled with the force or downward pressure of the resetting coil spring 32 in the housing 16, normally balances the hydraulic upward pressure of the hydraulic fluid (oil) entering the housing 16 by way of the high pressure inlet 42–43 so that a static or balanced condition is maintained in the housing 16 and the visual warning signal embodied in the device is normally concealed from veiw externally of the housing 16 while, at the same time, the electrical circuit 27 to the audio or audio-visual warning signal 26 remains open and the audio or audio-visual signal 26 remains inactive. However, when a failure occurs in the hydraulic system 27, such as clogging of the oil filter 19, the hydraulic pressure of the oil entering the housing 16 from the oil filter 19 by way of the low pressure inlet 45–46 will drop with the result that the hydraulic pressure of the oil from the hydraulic (oil) pump 20, entering the housing 16 by way of the high pressure inlet 42–43, will then exceed the combined forces of the hydraulic (oil) pressure of the hydraulic fluid (oil) flowing out of the oil filter 19 into the housing 16 by way of the low pressure inlet 45–46, and the predetermined downward pressure or force of the resetting compression coil spring 32. When this condition arises the pressure of the oil from the pump 20 entering the housing 16 by way of the high pressure inlet 42–43 will raise the torroidal magnet 75 and the movable contact member 31 mounted thereon in the housing 16 so that the movable contact 31 will engage the stationary contact member 30, thereby closing the electrical circuit 27–29 to the audio or audio-visual warning signal 26 while, at the same time, raising the normally concealed visual signal device in the housing 16 into a position in which it may be readily seen through a transparent window 57 from outside the housing 16, as will be described more fully hereinafter.

The visual alarm signal in the housing 16 and the audio or audio-visual warning alarm signal 26 will remain in their thus actuated positions until the abnormal condition in the hydraulic system 17, such as clogging of the filter 19, has been corrected, whereupon the downward force of the resetting coil spring 32, coupled with the downward force or pressure of the hydraulic fluid (oil) entering the housing 16 from the filter 19, by way of the low pressure inlet 45–46, will overcome the upward force of the hydraulic fluid entering the housing 16 from the pump 20, by way of the high pressure inlet 42–43. The operating parts of the new combination visual and audio or audio-visual warning signal device 15 will then be returned to their normal at rest position, that is, the visual signal in the housing will be returned to its normal concealed position and the electrical circuit 27–29 to the audio or audio-visual warning signal device 26 will become inactive and silent.

DETAILED DESCRIPTION OF THE CONSTRUCTION OF THE PREFERRED FORM OF THE INVENTION ILLUSTRATED IN FIGS. 1 to 8, INCLUSIVE

Figures 1, 2:
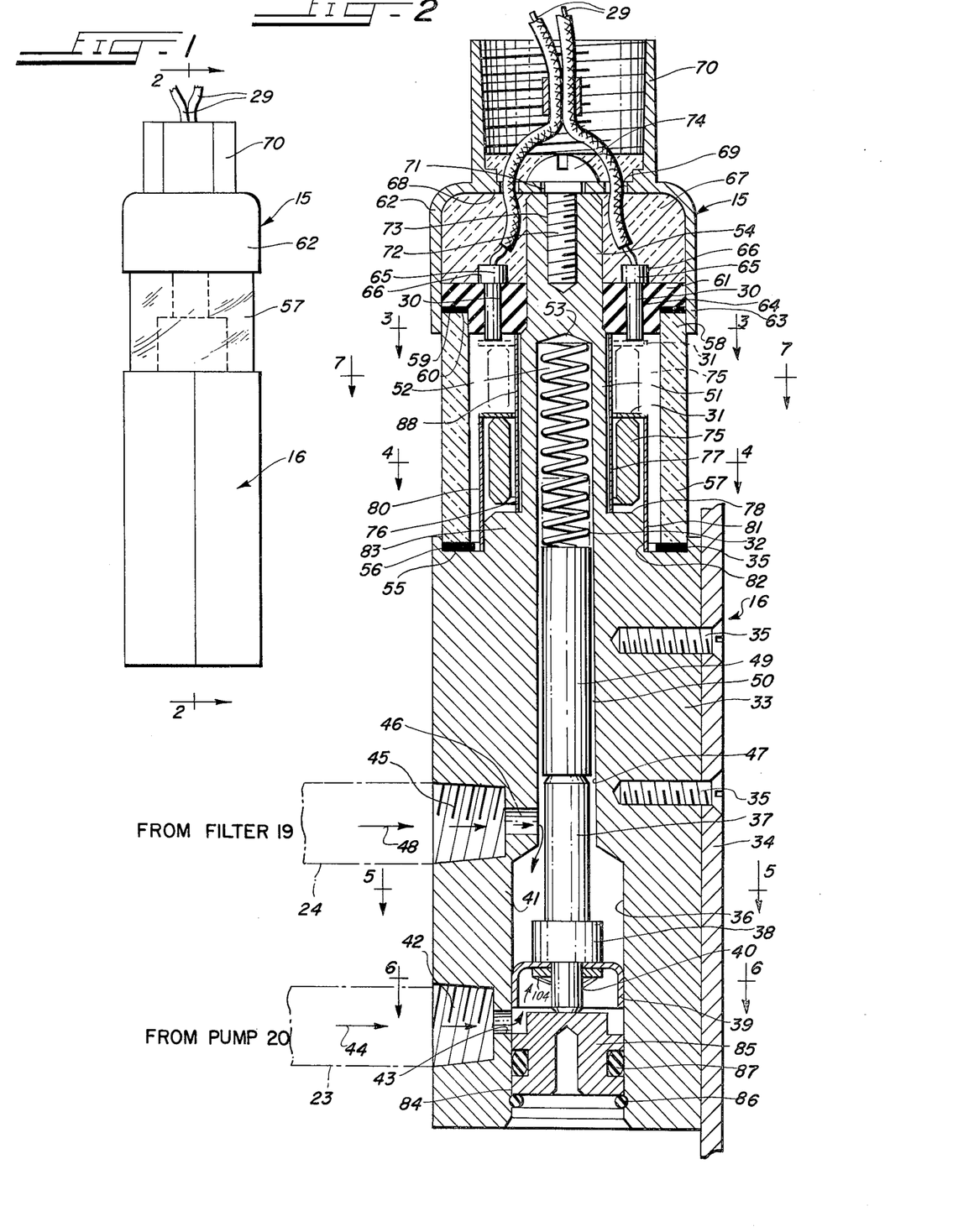
FIG. 1 is an elevational view of a preferred embodiment of the new combination visual and audio or audio-visual differential pressure warning signal device.
FIG. 2 is an enlarged central vertical sectional view on line 2—2 in FIG. 1.
Figure 3:
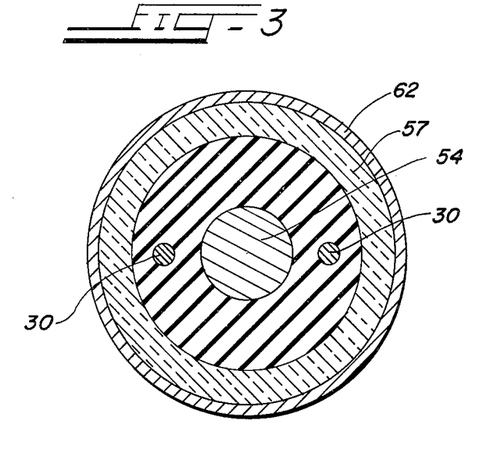
FIG. 3 is a transverse sectional plan view on line 3—3 in FIG. 2.
Figure 4:
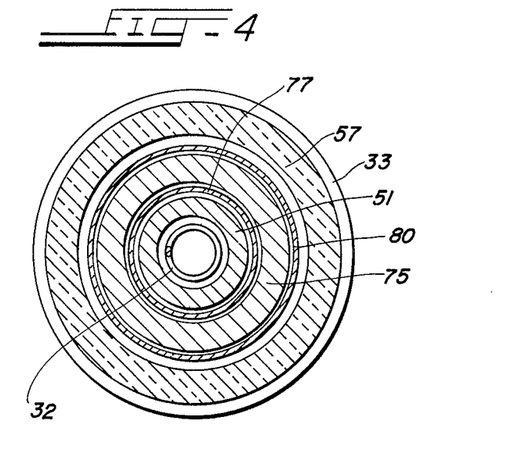
FIG. 4 is a transverse sectional plan view on line 4—4 in FIG. 2.
Figure 5:
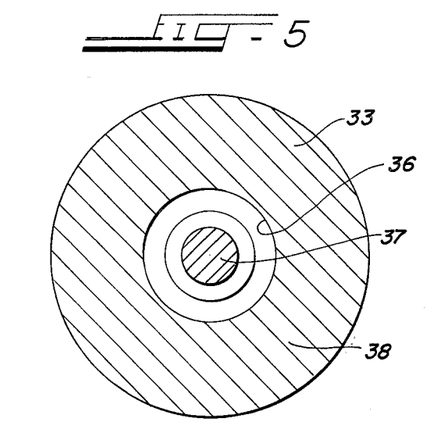
FIG. 5 is a transverse sectional plan view on line 5—5 in FIG. 2.
Figure 6:
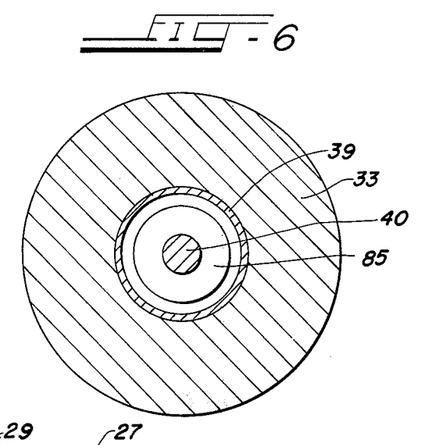
FIG. 6 is a transverse sectional plan view on line 6—6 in FIG. 2.
Figure 7:
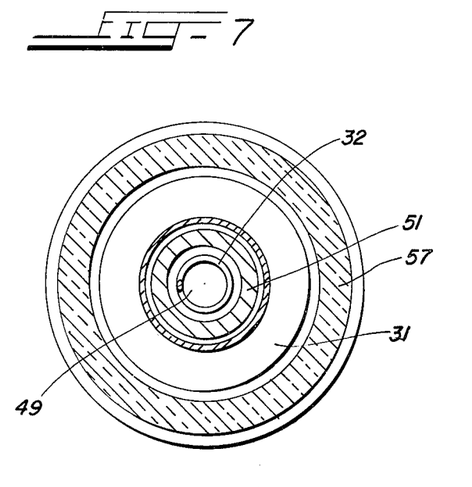
FIG. 7 is a sectional plan view on line 7—7 in FIG. 2.

The housing 16 includes a body 33 which may be attached by means of a mounting plate 34 to any suitable upright or vertical supporting surface, the body 33 being attached to the mounting plate 34 by fastening elements in the form of screws (FIG. 2). A cylindrical cavity 36 is formed in the body 33 of the housing 16 and a piston unit 39 is movably mounted in the cylindrical cavity 36. The piston unit 39 is mounted on a stem 37 and is supported on the enlarged lower end portion or head 38 of the stem 37 and the piston unit 39 is fastened to the enlarged lower end portion or head 38 by means of a retainer 104 which is mounted on a reduced diameter lower end portion of the piston stem 37.

As shown in FIG. 2, hydraulic fluid (oil) from the pump 20 flows into the housing 16 by way of the line 23 and the high pressure inlet 42–43 into the body 33 of the housing 16 and into the cylindrical cavity 36 below the piston unit 37–38–39–40, along the path of the arrows 44, thereby tending to raise the piston unit 37–38–39–40 in the cylindrical cavity 36, as will be described more fully hereinafter.

As is also shown in FIG. 2, the hydraulic fluid (oil) from the filter 19 flows by way of the line 24 and the low pressure inlet 45–46, into a reduced diameter upper cylindrical cavity 47 which is formed in the body 33 in communication with the cylindrical cavity 36 from which the hydraulic fluid (oil) thus entering the reduced diameter upper end cylindrical cavity 47 flows in the direction of the arrows 48 downwardly into the main body of the cylindrical cavity 36 and against the convex surface of the piston 39, thereby tending to lower the piston unit 37–38–39–40 in the cylindrical cavity 36–47. Thus the piston unit 37–38–39–40 is normally disposed in its lowered position, as in FIG. 2, with the reduced diameter lower end portion 40 thereof abutting a combination motion-limiting stop and sealing member 85, as will be explained more fully hereinafter.

The reduced diameter upper end cylindrical cavity 47 extends upwardly in the body 33 is in direct communication and coaxial alignment with the cylindrical cavity 36 as shown in FIG. 2. A generally cylindrical magnet 49 is slidably mounted in the reduced diameter cylindrical cavity 47 and is made of any suitable ferrous magnetic material. The housing body 33 has an upward extension 51 of reduced outside diameter, relative to the diameter of the main body 33 of the housing 16, into which the cylindrical cavity 47 extends, thereby forming a coaxial cylindrical cavity 52 in which the resetting compression coil spring 32 is mounted, as shown in FIG. 2. As shown in FIG. 2, the upper end coil of the resetting coil spring 32 bears against the inner upper wall 53 of the bore cylindrical cavity 52; the inner upper wall 53 of the cylindrical cavity 52 being formed as the lower end portion of the top or head 54 of the housing body 33–51–54.

As is also shown in FIG. 2, the main housing body 33 has an annular shoulder 55 formed in the upper end portion thereof and an annular resilient rubber or like gasket 56 is mounted on the shoulder 55. The lower end portion of an annular transparent window 57 of glass or plastic resinous material, such for example as high impact polycarbonate, is mounted on the annular gasket 55 and extends upwardly therefrom; the upper end portion 58 of the transparent window 57 projecting into an annular shoulder 59 which is formed in an annular mounting member or ring 61 of electrically insulating material, and which is held in position by an upper annular metallic cap member 62 which has a lower end or skirt portion 63 which extends downwardly over the upper end portion of the transparent window 57.

The stationary or fixed electrical contact members 30—30 are mounted in openings 64 which are formed in the electrically insulating annular mounting member or ring 61 and each of the stationary or fixed contact members 30 has an integrally formed upper end or head portion 65 to which one of the electrical conductors 29 is electrically connected (FIG. 2).

The annular cap member 62 has a laterally extending or transverse wall 68 which extends thereacross and is provided with openings 69 for the passage of the electrical conductors 29. The electrical conductors 29 also extend upwardly through an annular threaded connecting member 70 which is formed as an integral upward extension of the annular cap member 62. The laterally extending wall 68 has a centrally arranged opening 71 formed therein for the passage of a fastening element in the form of a headed screw 72 which is threaded into an internally threaded bore 73 which is formed in the upward extension 54 of the housing body 33–51–54; the head 74 of the screw 72 resting on the upper surface of the transverse wall 68.

The annular space between the insulating member 61 and the cap 62 is preferably filled by a body of an electrically insulating epoxy resin material 67 in which the heads 65 of the stationary or fixed electrical contact members 30 are embedded, as at 66 (FIG. 2)

An annular or torroidal ceramic visual warning signal magnet 75 (the outer surface of which is preferably painted or otherwise colored red) is movably mounted within and radially inwardly of the transparent window 57 and within an annular plastic resinous or like nonmetallic opaque (black) housing or mask 80, which is stationarily mounted in the housing 16, the lower end portion 82 of the housing 80 resting on an annular shoulder 55 which is formed on the upper end portion of the main housing body 33. The housing or mask 80 acts as an opaque mask which normally conceals the movable and red colored visual torroidal magnet signal 75 from view through the transparent window 57.

A second plastic resinous or like non-magnetic material cylindrical housing 77 is stationarily mounted radially inwardly of the opaque or (black) mask or housing 80 and surrounds the reduced diameter upward extension 51 of the housing body 33; the lower end portion 76 of the stationary cylindrical member 77 resting on a shoulder 78 which is formed on the upper end of the main housing body 33 (FIG. 2). The upper end portion 88 of the non-magnetic cylindrical member 77 is preferably colored yellow and is normally readily visible through the transparent window 57, above the opaque black housing or mask 80.

The movable annular contact member or ring 31, which may be made of any electrically conductive metal, is adhesively mounted on and attached to the upper end portion of the red colored annular or torroidal (ceramic) warning signal magnet 75.

As shown in FIG. 2, the cylindrical cavity 36 has a lower end portion 84 in which the combination motion-limiting or stop and sealing member 85 is fixedly mounted and in which it is retained by a retaining ring 86; the member 85 being provided with a resilient sealing member or O-ring gasket 87 which is adapted to engage tightly against the wall of the lower end portion 84 of the cylindrical cavity 36 to provide a fluid tight seal therein.

The cylindrical magnet 49 and the red colored torroidal visual warning signal magnet 75 are of the same magnetic polarity so that they mutually repel each other, for a reason which will be described hereinafter.

DETAILED DESCRIPTION OF THE OPERATION OF THE WARNING SIGNAL DEVICE ILLUSTRATED IN FIGS. 1 TO 8, INCLUSIVE

When the new differential pressure warning signal device 15 is mounted in a hydraulic or pneumatic system such, for example, as in the oil filter system 17 illustrated in FIG. 8, the hydraulic fluid or oil in the system 17 will flow under a predetermined pressure from the pump 20 by way of the line 23 into the high pressure inlet 42–43 in the housing body 33 from which the hydraulic fluid or oil will flow along the path of the arrows 44 in FIG. 2 through the inner inlet 43 into the concave side of the piston 39, thereby tending to raise the piston unit 37–38–39–40 in the cylindrical cavities 36–47. At the same time the hydraulic fluid or oil will flow from the system 17 into the low pressure inlet 45–46 in the housing body 33 by way of the line 24 from the filter 19. The hydraulic fluid or oil thus entering the low pressure inlet 45–46 flows along the path of the arrows 48 into the cylindrical cavity 36 on the convex side of the piston 39, thereby tending to depress or lower the piston unit 37–38– 39–40 in the cylindrical cavities 36–47, acting against the force of the hydraulic fluid or oil which enters the cylindrical cavities 36–47 to the concave side of the piston by way of the high pressure inlet 44–43 and which tends to raise the piston unit 37–38–39–40 in the cylindrical cavities 36–47.

The hydraulic pressure or force of the hydraulic fluid or oil which enters the cylindrical cavities 36–47 for the system 17 by way of the low pressure inlet 45–46 is combined with the downward force or pressure of the resetting compression coil spring 32 which acts upon the cylindrical magnet 49 to urge the latter downwardly into engagement with the piston unit 37–38–39–40, thereby tending to lower the piston unit 37–38–39–40 in the cylindrical cavities 36–47, against the action of the hydraulic fluid or oil entering the housing 16 by way of the high pressure inlet 44–43 from the pump 20 by way of the line 23.

Under normal operating conditions in a clean hydraulic system, as 17, in which the new differential pressure visual and audio or audio-visual warning signal device 15 is arranged, the combined forces of the hydraulic fluid entering the cylindrical cavities 36–47 by way of the low pressure inlet 45–46 from the filter 19 and the downward force or pressure of the resetting compression coil spring 32 create a balanced or static condition with the counterforce or upward pressure of the hydraulic fluid or oil entering the piston cylinder 36–47 by way of the high pressure inlet 44–43 from the pump 20 so that the red colored visual signal in the form of the red colored annular or torroidal ceramic magnet 75 remains in its normal concealed position (as in full lines, FIG. 2), behind the black annular opaque housing or mask 80. When the parts are so disposed the annular contact member or ring 31 remains in its normal at rest position, as in full lines, FIG. 2, and out of contact with the stationary contact members 64 so that the electrical circuit 27 remains open and the audio or audio-visual warning signal device or alarm 26 (FIG. 7) remains inactive and silent. In this position of the parts the yellow colored upper portion 88 of the second annular non-magnetic material cylindrical housing 77 is visible from outside the housing 16 through the annular transparent window 57 and above the opaque or black housing 80.

However, when an abnormal condition develops in the hydraulic or oil system 17 in which the new differential pressure visual and audio or audio-visual warning signal device 15 is arranged, such as clogging of the filter 19, the normally static and balanced condition of the parts, as described above, is disturbed and an unbalanced condition is created, in which the pressure of the hydraulic fluid entering the cylindrical cavities 36–47 through the low pressure inlet 45–46 from the filter 19, by way of the line 24, drops with the result that the combined downward forces or pressures of the resetting coil spring 32 and the hydraulic pressure or downward force exerted on the piston unit 37–38–3-9–40 are insufficient to overcome the hydraulic upward pressure or force of the hydraulic fluid or oil entering the cylindrical cavities 36–47 by way of the high pressure inlet 44–43 and the line 23 from the pump 20. When such an unbalanced condition occurs the hydraulic pressure or force of the hydraulic fluid or oil entering the cylindrical cavity 36 from the concave side of the piston unit 37–38–39–40 raises the piston unit 37–38–39–40 in the cylindrical cavities 36–47, against the combined downward forces of the resetting coil spring 32 and the downward force of the hydraulic fluid or oil entering the cylindrical cavities 36–47 from the low pressure inlet 45–46, with the result that the piston unit 37–38–39–40 moves upwardly in the cylindrical cavities 36–47 and thereby raises the cylindrical magnet 49 in the reduced diameter upper cylinder 50.

It will be noted that the torroidal ceramic magnet 75 lies radially outwardly of the cylindrical magnet 49 so that when the magnet 49 is thus raised in the cylinder 50 it enters the second stationary magnetic field of the annular or torroidal red colored visual warning signal like polarity, repel each other and the annular red colored visual warning signal magnet 75 is repelled upwardly by the cylindrical magnet 49 and moves from its normal or at rest position, as in full lines, FIG. 2, into its raised and actuated position, as in dotted lines, FIG. 2, in which it is disposed radially outwardly of the yellow colored upper end portion 88 of the second stationary housing 77. During this operation the red colored annular or torroidal visual warning signal magnet 75 moves gradually out of and above its opaque housing or mask 80–88 and becomes clearly visible through the transparent annular window 57, thereby creating a visual warning signal to show the observer that some abnormal condition has arisen in the hydraulic or oil system 17, such as partial or total clogging of the filter 19.

At the same time, that is, when the red colored visual annular or torroidal warning signal magnet 75 is thus raised into position to be seen through the transparent annular window 57, and thus act as a visual warning signal, the annular or torroidal warning signal magnet 75 raises the annular contact member or ring 31 thereon upwardly from its normal or at rest position, as in full lines, FIG. 2, into its raised and actuated position, as in dotted lines, FIG. 2, and in which latter position the annular contact member or ring 31 engages the fixed or stationary contact members 30—30 and thus closes the electrical circuit 27 to the audio or audio-visual alarm 26 and thereby actuates the latter to create a second and audio or audio-visual alarm to the effect that an abnormal condition has arisen in the hydraulic or oil system 17, such as total clogging of the filter 19.

When the abnormal condition which has arisen in the hydraulic or oil system 17, such as the clogging of the filter 19, has been corrected, the hydraulic pressure of the hydraulic fluid or oil entering the cylindrical cavities 36–47 by way of the low pressure inlet 45–46 will rise to its predetermined normal level and, when coupled with the downward pressure or force of the resetting coil spring 32, will overcome the hydraulic upward pressure or force of the hydraulic fluid or oil entering the cylindrical cavity 36 by way of the high pressure inlet 44–43 from the pump 20 with the result that piston unit 37–38–39–40 will be forced downwardly in the cylindrical cavities 36–47. At the same time, the cylindrical magnet 49 will drop downwardly in the cylinder or bore 50 out of the influence of the magnetic field of the red colored visual torroidal warning signal magnet 75 with the result that the red colored visual torroidal signal magnet 75 will fall by gravity back into its black or opaque housing or mask 80 and become invisible through the annular transparent window 57. During this operation, the annular contact member or ring 31 on the upper end portion of the annular or torroidal magnet 75 will also fall by gravity downward from its raised and actuated position in contact with the stationary or fixed contact members 30—30 (as in dotted lines, FIG. 2) into its normal or at rest position (as in full lines, FIG. 2) and out of contact with the stationary or fixed contact members 30–30, thereby breaking the electrical circuit 27 to the audio or audio-visual warning signal or alarm signal device 26 and thus rendering the audio or audio-visual alarm signal device inactive or silent.

SPECIFICATIONS AS TO CERTAIN PARTS AND OPERATING CONDITIONS IN A TYPICAL EMBODIMENT OF THE FORM OF THE INVENTION AS ILLUSTRATED IN FIGS. 1 TO 8, INCLUSIVE

The new warning signal unit may be made to any desired size and may be designed to meet any desired operating pressure conditions. However, specifications and operating conditions of certain of the parts in a typical embodiment of the form of the invention illustrated in FIGS. 1 to 8, inclusive, are as follows:

1. Dimensions of the housing 33: 1.38 inches in diameter and 4.62 inches in heighth;
2. Dimensions of the cylindrical cavity 36–47: main body 36 0.582 inches in diameter and 1.31 inches in heighth, and the extension 47 2.45 inches in heighth and 0.280 inches in diameter;
3. Resetting compression coil spring 32: 0.260 inches in diameter and 0.970 inches in heighth; maximum pressure range 45 psi;
4. Magnet 49: 0.250 inches in diameter and 1.25 inches in heighth;
5. Central bore 50–81: 0.280 inches in diameter and 2.45 inches in heighth;
6. Torroidal magnet 75: 0.875 inches in diameter and 0.438 inches in heighth;
7. Normal working pressure range of fluid power in the system 17 entering the housing 16 by way of the low pressure inlet 45–46, as desired, but with 3000 psi; and
8. Normal working pressure range of fluid power entering the housing 16 by way of the high pressure inlet 42–43 from pump 20, as desired with maximum 3000 psi.

DETAILED DESCRIPTION OF THE MODIFICATION ILLUSTRATED IN FIGS. 9 TO 12, INCLUSIVE

A modification of the invention is illustrated in FIGS. 9 to 12, inclusive, of the drawings, and those parts thereof which are similar to corresponding parts in the form of the invention illustrated in FiGS. 1 to 8, inclusive, have been given the same reference numerals followed by the additional and distinguishing reference character "a".

The form of the invention illustrated in FIGS. 9 to 12, inclusive, is of the cartridge type and is designed and constructed to be installed or mounted in any suitable housing, as 101, which may form part of an hydraulic or pneumatic (fluid power) system in which the new warning signal device may be used, rather than being mounted on a support, as 34, as in the use of the form of the invention illustrated in FIGS. 1 to 8, inclusive.

To this end the body of the differential pressure warning signal device 15a is indicated at 90 and has a hexagonal-shaped shoulder or upper end portion 89 and an externally threaded reduced diameter portion 91, which is adapted to be screw threaded into a suitable threaded opening 102 in the housing 90. The screw threaded body portion 90–91 has a reduced diameter lower end portion 94–95 and the low pressure inlet 96 from the hydraulic or oil system (as in FIG. 8) is formed in the side wall 95 of the depending lower end portion 94–95 of the screw threaded body 90–91 and enters into the cylinrical cavities 36a–47a above the convex side of the piston unit 37a–38a–39a–40a (FIG. 10).

The high pressure inlet into the cylindrical cavities 36a–47a is in the form of the opening of 97 (FIG. 10) from which the hydraulic fluid or oil pressure from the pump acts directly on the concave side of the piston unit 37a –38a–39a–40a. A roll pin 99, which is supported in the wall of the lower unthreaded end portion 94–95 of the threaded body 90–91, limits the downward motion of the piston unit 37a–38a–39a–40a.

Figure 10:
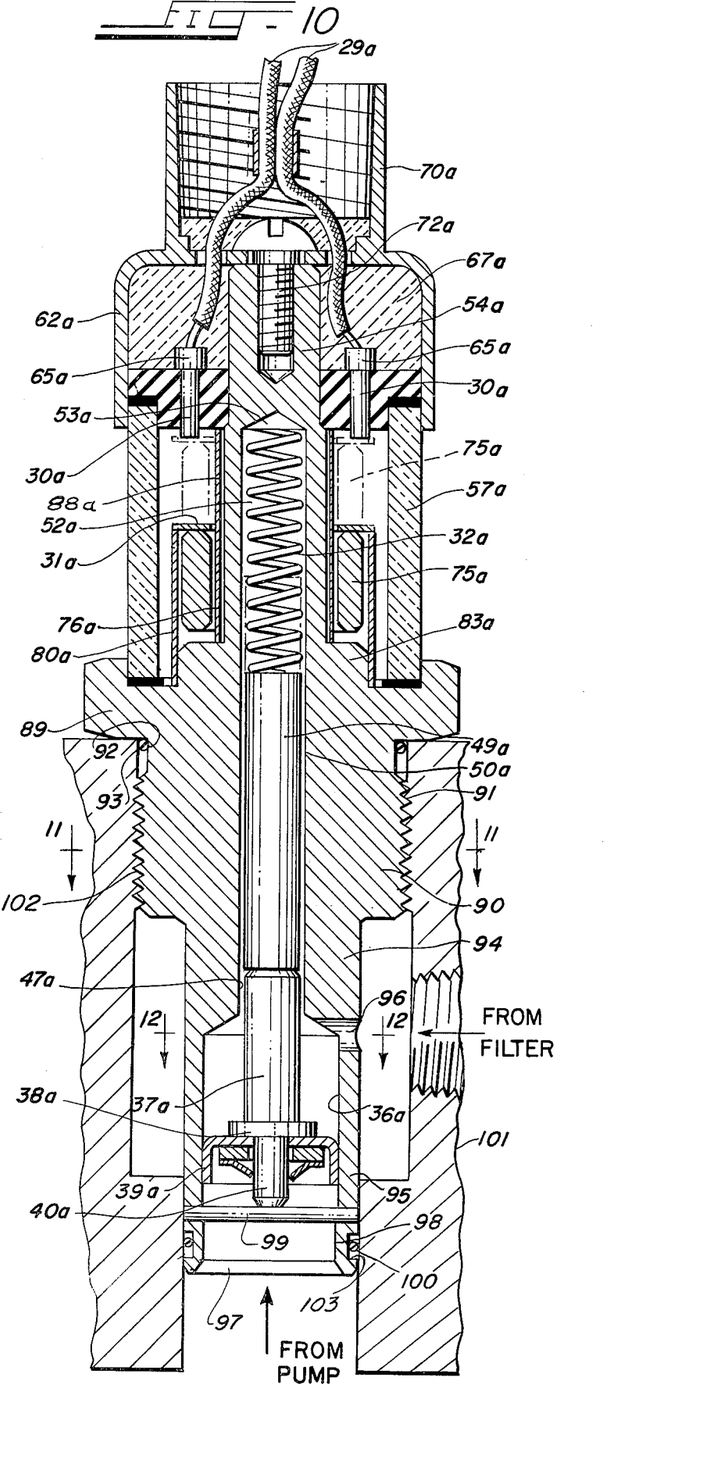
FIG. 10 is an enlarged central sectional view on line 10—10 in FIG. 9.
Figure 11:
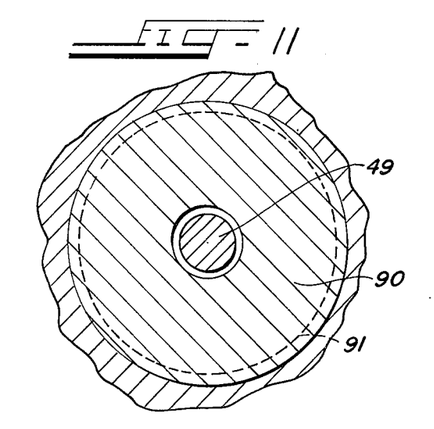
FIG. 11 is a transverse sectional plan view on line 11—11 in FIG. 9.
Figure 12:
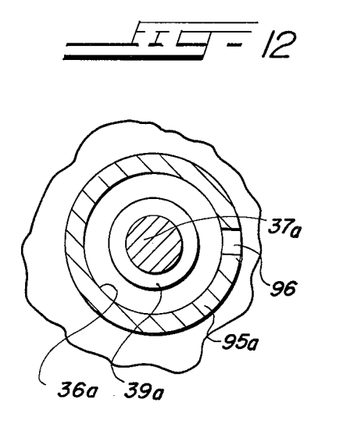
FIG. 12 is a transverse sectional plan view on line 12—12 in FIG. 10.

An O-ring seal 100 is mounted in a suitable annular groove 103 which is formed in the lower unthreaded depending extention 98 of the reduced diameter portion 94–95, and this O-ring seal provides a seal between the differential pressure indicating device 15a and the housing 101 (FIG. 10).

OPERATION OF THE MODIFICATION SHOWN IN FIGS. 9 TO 12, INCLUSIVE

The use and operation of the modified form of the new visual and audio or audio-visual warning signal device shown in FIGS. 9 to 12, inclusive, are substantially the same as the use and operation of the preferred embodiment of the invention illustrated in FIGS. 1 to 8, inclusive, except that in the use of this form of the invention the new warning signal device may be mounted in any suitable housing, as 101, in an hydraulic oil or pneumatic system (as 17, FIG. 8) by screwing the externally threaded body 90–91 into the threaded opening 102 in the housing 101, rather than mounting the warning signal device on a mounting plate or support as 34, in the form of the invention illustrated in FIGS. 1 to 8, inclusive.

When thus mounted the hydraulic fluid from the pump, as 20, in FIG. 8, will enter the high pressure hydraulic fluid inlet port 97 at the bottom of the unit and will exert an upward thrust or force on the piston 39a from below while, at the same time, the hydraulic fluid from the system, as from the filter 19, in FIG. 8, will enter the low pressure inlet 96 and flow into the cylindrical cavities 36a–47a and will combine with the downward pressure or force of the resetting coil spring 32a, to exert a downward pressure or force on the head 38a of the convex side of the piston 39a, whereupon the form of the new visual and audio or audio-visual warning signal device shown in FIGS. 9 to 12, inclusive, will function in substantially the same manner, and will accomplish the same advantageous results, as the form of the invention illustrated in FIGS. 1 to 8, inclusive, and as described above.

It will thus be seen from the foregoing description, considered in conjunction with the accompanying drawings, and the claims set forth hereinafter, that the present invention provides a new and improved combination visual and audio or audio-visual differential pressure warning signal device for hydraulic and pneumatic (fluid power) systems having the desirable advantages and characteristics and accomplishing its intended objects, including those hereinbefore pointed out and others which are inherent in the invention.

I claim:
1. A combination visual and audio or audio-visual differential pressure warning signal device for use in fluid power systems employing an hydraulic or pneumatic fluid power medium comprising:
   a housing adapted to be arranged in and in communication with the fluid power system and including a body having therein
   1. an internal cylindrical cavity;
   2. a piston unit including a piston head movably mounted in the said cylindrical cavity;
   3. a high pressure inlet in the said body of the said housing for the flow of the fluid power from the system into the said cylindrical cavity below the said piston unit;
   4. a low pressure inlet in the body of the said housing for the flow of the fluid power from the system into the said cylindrical cavity above the said piston unit;
   5. a transparent window;
   b. stationary electrical contact means in the said housing adapted to be connected to an electrical circuit which includes an electrically actuatable audio or audio-visual warning signal device;
   c. a first magnetic means movable mounted in the said housing above and in coaxial alignment with the said piston unit;
   d. a second magnetic means movably mounted in the said housing radially outwardly of the said first magnetic means and having thereon a visual warning signal;
   e. opaque masking means stationarily mounted in the said housing radially inwardly of and adjacent to the said transparent window and normally concealing the said second magnetic means and the said visual warning signal thereon from view through the said transparent window;
   f. movable electrical contact means movably mounted in the said housing on the said second magnetic means and movable therewith into electrical contacting engagement with the said stationary electrical contact means to close the said electrical circuit to the said electrically actuatable audio or audio-visual warning signal device;
   g. spring means in the said housing above and in coaxial alignment with the said first magnetic means and with the said piston unit and coacting with the force of the fluid power entering the said cylindrical cavity from the system by way of the said low pressure inlet to urge the said piston unit downwardly in the said cylindrical cavity against the action of the upward force of the said fluid power entering the said cylindrical cavity from the system by way of the said high pressure inlet below the said piston head;
   h. whereby under normal operating conditions of the system a static balanced condition is maintained between the combined downward force of the said spring means and the downward force of the fluid power from the low pressure inlet into the said cylindrical cavity to retain the said piston unit and the said second magnetic means in their normal at rest position against the action of the upward force of the fluid power from the said high pressure inlet into the said cylindrical cavity, whereas when the pressure of the fluid power in the system entering and said cylindrical cavity from the said low pressure inlet drops due to a hazardous condition in the system the fluid power from the high pressure inlet into the said cylindrical cavity will urge the said piston unit upwardly in the said cylindrical cavity against the combined downward forces of the said spring means and the fluid power from the low pressure inlet and thus raise the said first magnetic means into the magnetic field of the said second magnetic means and thereby cause the said first magnetic means to repel the said second magnetic means upwardly in the said housing and thus expose the said visual warning signal thereon to view through the said transparent window while at the same time moving the said movable contact means into electrical contacting engagement with the said stationary contact means to close the said electrical circuit to the said electrically actuatable audio or audio-visual warning signal device.

2. A combination differential pressure visual and audio or audio-visual warning signal device as defined in claim 1 in which
   a. the said first magnetic means is in the form of a generally cylindrical ferrous metal magnet; and
   b. the said second magnetic means is in the form of a torriodal ceramic magnet disposed radially outwardly of the said generally cylindrical ferrous metal magnet in the said housing.

3. A combination differential pressure visual and audio or audio-visual warning signal device as defined in claim 1 in which
   a. the said visual warning signal on the said torroidal magnet is in the form of an external wall surface on the said torroidal magnet having thereon a red colored visual warning signal indicium.

4. A combination differential pressure visual and audio or audio-visual warning signal device as defined in claim 3 in which
   a. the said opaque masking means in in the form of a black colored cylindrical member mounted in the said housing radially inwardly of the said transparent window and normally concealing the said red colored visual warning signal indicium on the said torroidal magnet from view through the said transparent window.

5. A combination differential pressure visual and audio or audio-visual warning signal device as defined in claim 2 in which
   a. the said torroidal ceramic magnet has
      1. an annular upper surface; and in which
   b. the said movable electrical contact means is in the form of an annular electrical contact member mounted on the said annular upper surface of the said torroidal ceramic magnet.

6. A combination differential pressure visual and audio or audio-visual warning signal device as defined in claim 1 in which
   a. the said body of the said housing includes
      1. a side wall having the said high pressure fluid power inlet therein; and in which
      2. the said low pressure inlet is formed in the said side wall of the said body of the said housing above the said high pressure fluid power inlet.

7. A combination differential pressure visual and audio or audio-visual warning signal device as defined in claim 1 which includes
   a. means for mounting the said housing on a vertical supporting surface.

8. A combination differential pressure visual and audio or audio-visual warning signal device as defined in claim 1 in which
   a. the said body of the said housing includes
      1. an externally threaded wall surface which is adapted to be threaded into an internally threaded opening in a housing which is embodied in the said fluid power system.

9. A combination differential pressure visual and audio or audio-visual warning signal device as defined in claim 8 in which
   a. the said body of the said housing includes
      1. a lower end portion having the said high pressure fluid power inlet formed therein; and in which
   b. the said body of the housing includes a side wall having the said low pressure inlet extending therein to above the said high pressure inlet.

10. A combination visual and audio or audio-visual differential pressure warning signal device for use in fluid power systems employing an hydraulic or pneumatic fluid power medium comprising:
   a. a housing adapted to be arranged in and in communication with the fluid power system and including a body having therein
      1. an internal cylindrical cavity;
      2. a piston unit including a piston head movably mounted in the said cylindrical cavity;
      3. a high pressure inlet in the said body of the said housing for the flow of the fluid power from the system into the said cylindrical cavity below the said piston head;
      4. a low pressure inlet in the body of the said housing for the flow of the fluid power from the system into the said cylindrical cavity above the said piston unit;
      5. a transparent window;
   b. stationary electrical contact means in the said housing adapted to be electrically connected to an electrical circuit which includes an electrically actuable audio or audio-visual warning signal device;
   c. a first magnetic means movably mounted in the said housing above and in coaxial alignment with the said piston unit;
   d. a second magnetic means movably mounted in the said housing radially outwardly of the said first magnetic means and having thereon a visual warning signal;
   e. opaque masking means stationarily mounted in the said housing radially inwardly of and adjacent to the said transparent window and normally concealing the said second magnetic means and the said visual warning signal thereon from view through the said transparent window;
   f. movable electrical contact means movably mounted in the said housing above the said second magnetic means and movable thereby into electrical contacting engagement with the said stationary electrical contact means to close the said electrical circuit to the said electrically actuatable audio or audio-visual warning signal device; and
   g. spring means in the said housing above and in coaxial alignment with the said first magnetic means and with the said piston unit and coacting with the downward force of the fluid power entering the said cylindrical cavity from the said system by way of the said low pressure inlet to urge the said piston unit downwardly in the said cylindrical cavity against the action of the upward force of the said fluid power entering the said cylindrical cavity from the system by way of the said high pressure inlet below the said piston unit so as to maintain a static or balanced condition between the combined downward force of the said spring means and the fluid power from the said low pressure unit tending to urge the said piston unit downwardly in the said cylindrical cavity against the upward force of the fluid power entering the said housing by way of the said high pressure fluid power tending to raise the said piston unit in the said cylindrical cavity whereby when the said static or balanced condition is maintained in the said system the said visual warning signal is concealed from view by the said opaque masking means and the said movable contact means is disposed out of electrical contacting engagement with the said stationary electrical contact means.

11. A differential pressure warning signal device for use in fluid power systems employing a hydraulic or pneumatic fluid power medium comprising:
 a. a housing adapted to be arranged in and in communication with the fluid power system and including a body having therein
  1. an internal cylindrical cavity;
  2. a piston unit including a piston head movably mounted in the said cylindrical cavity;
  3. a high pressure inlet in the said body of the said housing for the flow of the fluid power from the system into the said cylindrical cavity below the said piston unit;
  4. a low pressure inlet in the body of the said housing for the flow of the fluid power from the system into the said cylindrical cavity above the said piston unit;
  5. a transparent window;
 b. stationary electrical contact means in the said housing adapted to be connected to an electrical circuit which includes an electrically actuatable warning signal device;
 c. a first magnetic means movably mounted in the said housing above and in coaxial alignment with the said piston unit;
 d. a second magnetic means movably mounted in the said housing radially outwardly of the said first magnetic means and having thereon a visual warning signal;
 e. opaque masking means stationarily mounted in the said housing radially inwardly of and adjacent to the said transparent window and normally concealing the said second magnetic means and the said visual warning signal thereon from view through the said transparent window;
 f. movable electrical contact means movably mounted in the said housing on the said second magnetic means and movable therewith into electrical contacting engagement with the said stationary electrical contact means to close the said electrical circuit to the said electrically actuatable warning signal device; and
 g. spring means in the said housing above and in coaxial alignment with the said first magnetic means and with the said piston unit and coacting with the fluid power entering the said cylindrical cavity from the system by way of the said low pressure inlet to urge the said piston unit downwardly in the said cylindrical cavity against the action of the upward force of the said fluid power entering the said cylindrical cavity from the system by way of the said high pressure inlet below the said piston unit so as to maintain a static or balanced condition between the combined forces of the said spring means and the fluid power from the said low pressure unit tending to urge the said piston unit downwardly in the said cylindrical cavity against the upward force of the fluid power entering the said housing by way of the said high pressure fluid power tending to raise the said piston unit in the said cylindrical cavity whereby when the said static or balanced condition is maintained the said visual warning signal is concealed from view by the said opaque masking means and the said movable contact means is disposed out of electrical contacting engagement with the said stationary electrical contact means.

12. A differential pressure warning signal device for use in fluid power systems employing an hydraulic or pneumatic fluid power medium comprising:
 a. a housing adapted to be arranged in and in communication with the fluid power system and including a body having therein
  1. an internal cylindrical cavity;
  2. a piston unit including a piston head movably mounted in the said cylindrical cavity;
  3. a high pressure inlet in the said body of the said housing for the flow of the fluid power from the system into the said cylindrical cavity below the said piston head;
  4. a low pressure inlet in the body of the said housing for the flow of the fluid power from the system into the said cylindrical cavity above the said piston head;
 b. stationary electrical contact means in the said housing adapted to be connected to an electrical circuit which includes an electrically actuatable warning signal device;
 c. a first magnetic means movably mounted in the said housing above and in coaxial alignment with the said piston unit;
 d. a second and torroidal magnetic means movably mounted in the said housing radially outwardly of the said first magnetic means;
 e. movable electrical contact means movably mounted in the said housing above the said second and torroidal magnetic means and movable by the said second and torroidal magnetic means into electrical contacting engagement with the said stationary electrical contact means to close the said electrical circuit to the said electrically actuatable warning signal device; and
 f. spring means in the said housing above and in coaxial alignment with the said first magnetic means and with the said piston unit and coacting with the force of the fluid power entering the said cylindrical cavity from the system by way of the said low pressure inlet to urge the said piston unit downwardly in the said piston cylinder against the action of the upward force of the said fluid power entering the said cylindrical cavity from the system by way of the said high pressure inlet below the said piston head so as to maintain a static or balanced condition between the combined downward forces of the said spring means and the fluid power from the said low pressure unit tending to urge the said piston unit downwardly in the said cylindrical cavity against the upward force of the fluid power entering the said housing by way of the said high pressure fluid power tending to raise the said piston unit in the said cylindrical cavity whereby when the said static or balanced condition is maintained the said movable contact means is disposed out of electrical contacting engagement with the said stationary electrical contact means and the said electrical circuit to the said electrically actuatable warning signal device remains open and said electrically actuatable warning signal device remains inactive.

13. A differential pressure warning signal device as defined in claim 12 in which
 a. the said first magnetic means is in the form of a generally cylindrical ferrous metal magnetic member;
 b. the said second magnetic means is in the form of an annular or torroidal ceramic magnet member disposed radially outwardly of the said ferrous metal magnetic member in the said housing; and in which
 c. the said first magnetic means and the said second magnetic means are of the same magnetic polarity and are mutually magnetically repellant.

* * * * *